United States Patent [19]
Nagano et al.

[11] Patent Number: 5,171,075
[45] Date of Patent: Dec. 15, 1992

[54] CASSETTE OR COMPACT DISK HOLDER

[75] Inventors: Akiyoshi Nagano; Shigeru Yabuya, both of Aichi, Japan

[73] Assignee: Toyoda Gosei Co., Ltd., Nishikasugai, Japan

[21] Appl. No.: 852,909

[22] Filed: Mar. 18, 1992

Related U.S. Application Data

[63] Continuation of Ser. No. 641,897, Jan. 16, 1991, abandoned.

[30] Foreign Application Priority Data

| Jan. 16, 1990 [JP] | Japan | 2-2556[U] |
| Jan. 26, 1990 [JP] | Japan | 2-6621[U] |
| May 1, 1990 [JP] | Japan | 2-46793[U] |
| Oct. 26, 1990 [JP] | Japan | 2-290144 |

[51] Int. Cl.[5] ................................. A47B 81/06
[52] U.S. Cl. ......................... 312/9.48; 312/319.1; 206/309
[58] Field of Search ............... 312/9, 10, 11, 12, 15, 312/311, 319; 206/307, 309, 387, 444

[56] References Cited

U.S. PATENT DOCUMENTS

| 4,399,913 | 8/1983 | Gelardi et al. | 312/10 X |
| 4,592,600 | 6/1986 | Bohnet et al. | |
| 4,640,415 | 2/1987 | Ackeret | 206/387 |
| 4,722,034 | 1/1988 | Ackeret | 312/12 X |
| 4,875,578 | 10/1989 | Nehl | 206/309 |
| 4,875,584 | 10/1989 | Ackeret | 206/387 |
| 4,896,925 | 1/1990 | Nehl | 312/12 |

FOREIGN PATENT DOCUMENTS 0341026 11/1986 Japan.

OTHER PUBLICATIONS

Toyoda Gosei, "Cassette Box" Journal of Technical Disclosure, Apr. 1989, pp. 1-3.

Primary Examiner—Kenneth J. Dorner
Assistant Examiner—Brian K. Green
Attorney, Agent, or Firm—Cushman, Darby & Cushman

[57] ABSTRACT

A holder includes an outer member, an inner member, an urging member and a locking mechanism. The outer member is box-shaped and has an opening defined therein. The inner member is supported in the outer member, so that the inner member can be moved in and out through the opening. The urging member is provided between the outer and inner members and urges the inner member outwardly relative to the opening. The locking mechanism selectively locking the inner member in the outer member. An object to be held is placed in the inner member. The holder is characterized in that the inner member has hinge portions and L-bent portions at ends thereof adjacent the opening so that the L-bent portions extend from the hinge portions and can be swung thereabout; when the inner member is moved inwardly relative to the outer member, the L-bent portions is pushed by an inside surface of the outer member so that the L-bent portions are swung inward and hold an object in the inner member; and when the inner member is moved outwardly relative to the outer member, the L-bent portions are swung outwardly so that the object can be removed from the holder.

11 Claims, 10 Drawing Sheets

CASSETTE OR COMPACT DISK HOLDER

This is a continuation of application Ser. No. 07/641,897, filed on Jan. 16, 1991, which was abandoned upon the filing hereof.

FIELD OF THE INVENTION

The present invention relates to a holder which accommodates a tape cassette case, a compact disk case or the like and is convenient for use in a motor vehicle or the like.

DESCRIPTION OF THE RELATED ART

Since car stereo units have become common place, it has become necessary to provide a place for accommodating cassette tapes or compact disks within the motor vehicle. Typically provision is made in the dashboard, the instrument panel or the like.

An accommodation case, which can be provided in a dashboard, is disclosed in U.S. Pat. No. 4,592,600. The case includes an outer member 01 and an inner member 03 supported in the outer member with a helical spring 02 so that the inner member can be moved in and out relative to the outer member, as shown in FIG. 24 of that patent. When a tape cassette is fitted on the inner member 03 and the inner member is then pushed against the urging force of the spring 02 so as to be moved into the outer member 01, a locking mechanism (not shown in FIG. 24) is actuated so that the inner member is held in the outer member. When a knob 04 is thereafter pushed, the locking mechanism is released so that the inner member 03 is moved out from the outer member 01 by the urging force of the helical spring 02 so that it is possible to take the cassette out of the accommodation case. A plurality of such accommodation cases can be coupled to each other and disposed in the dashboard to accommodate a plurality of tape cassettes which can then be removed at will. It should be noted that the tape cassette is placed in the accommodation case without its case. However, since tape cassettes and compact disks are usually stored in an individual case and the contents of the recording are usually indicated on the case, it would be preferable for the case containing the tape cassette or the compact disk to be accommodated in the accommodation case.

A cassette box, in which individual cases containing tape cassettes can be accommodated is disclosed as No. 6220/89 in the Journal of Technical Disclosure published by the Japan Institution of Invention and Information. The cassette box includes an outer member, a U-shaped inner member supported in the outer member and capable of being moved in and out relative thereto, and a push locking mechanism provided between the outer and the inner members. Each of the individual cases for the tape cassettes can be held on the inner member and then pushed toward the outer member to actuate the push locking mechanism to hold the case in the cassette box. Although one end face of the case containing the cassette is put in contact with the bottom portion of the inner member of the box as the case is held on the inner member in order to be accommodated in the box, no means for restricting the movement of the case is provided at the opening in the outer member of the box. To facilitate the insertion and removal of the case from the box, a gap is usually defined between the case and the inner or outer member of the box, even when the case is accommodated in the box. For these reasons, there is the problem that the case rattles in the box. Further, if the box is provided in an instrument panel, a center cluster or the like, the case is horizontally inserted and removed from the box. In that case, since the case accommodated in the box is freely movable out of the opening in of the outer member, the case may fly out of the box when the vehicle moves or stops suddenly.

If an individual case for a compact disk is to be accommodated in such a box including an outer member and a U-shaped inner member for holding the case thereon, the length of the side parts of the inner member must be increased. For that reason, there is the problem that after the inner member can become molded in a prescribed U-shape, the inner member is deformed so that both the side parts thereof approach each other which makes it difficult to accommodate the case in the box because the inner member remains deformed even after it is placed in the outer member.

SUMMARY OF THE INVENTION

The present invention was made in consideration of the problems mentioned above. Accordingly, it is an object of the invention to provide a holder in which an individual case containing a tape cassette or the like is accommodated so that the case can be taken out from the holder at will, the case does not rattle, and the case will not fly out, even if the case is disposed so that it is horizontally inserted and removed.

The holder provided in accordance with the first aspect of the present invention includes an outer member, an inner member, an urging member and a locking mechanism. The outer member is shaped as a box, and has an opening. The inner member is supported in the outer member so that the inner member can be moved in and out through the opening in the outer member. The urging member is provided between the outer and the inner members, and urges the inner member in such a direction as to move it out of the opening in the outer member. The locking mechanism holds the inner member in the outer member. An object is put into the inner member so as to be held in the holder. The holder is characterized in that the inner member has hinged portions and L-bent portions at the ends of the inner member near the opening of the outer member so that the L-bent portions extend from the hinged portions and can be swung about them. Further, when the inner member is moved into the outer member, the L-bent portions are pushed by the inside surface of the outer member so that the L-bent portions are swung inward and hold the object disposed in the inner member. Finally, when the inner member is moved out of the outer member, the L-bent portions are swung outward so that the object can be removed from the holder.

A holder provided in accordance with the second aspect of the present invention includes an outer member, an inner member, an urging member and a locking mechanism. The outer member is shaped as a box, and has an opening. The inner member is U-shaped and supported in the outer member so that the inner member can be moved in and out through the opening in the outer member. The inner member includes an inner portion, a pair of sliding portions extending from both ends of the inner portion, swung portions coupled to the sliding portions by hinged portions so as to be swingable about the hinged portions, and L-bent portions extending from the tips of the swung portions and bent inward. The urging member is provided between the outer and the inner members, and urges the inner member outwardly of the opening in the outer member. The locking mechanism holds the inner member in the outer member. An object is put into the inner member so as to be held in the holder. The holder is characterized in that the outer member includes restriction surfaces with which parts of the swung portions of the inner member come into contact after the hinged portions thereof when the inner member is moved into the outer member, and an accommodation space in which the swung portions swing outward when the inner member is moved out of the opening in the outer member are accommodated. More particularly, when the inner member is moved into the outer member, the swung portions come into contact with the restriction surfaces so as to be prevented from being swung outward and the L-bent portions of the inner member hold the object and when the inner member is moved outwardly from the outer member, the swung portions are swung outward and are accommodated in the accommodation space.

It is another object of the present invention to provide a holder whose inner member can revert to its original form even if the member is deformed after molding, so that the member can be disposed precisely along the outline of an object to be held.

A holder provided in accordance with a third aspect of the present invention includes an outer member, and an inner member supported in the outer member so that the inner member can be moved in and out relative to the outer member. An accommodated object such as a cassette case is held in the inner member so as to be accommodated in the holder. The holder is characterized in that the inner member is U-shaped and open at its ends so as to surround the three peripheral surfaces of the accommodated object, and includes a pair of side portions which extend in parallel to each other from the ends of the member, have engagement projections provided on their outside surfaces and include bar portions with head portions which are larger in diameter than the bar portions. The outer member has engagement openings which are provided in both of its side portions and facing the side portions of the inner member. The engagement openings include large holes through which the head portions can be inserted, and narrow holds through which the bar portions can be inserted. The engagement projections are engaged in the engagement openings so that the inner member is supported in the outer member and can be moved in and out relative thereto, and the length of the movement of the inner member is restricted.

The outer member is generally shaped as a box, and installed in an instrument panel or the like. The accommodated object is put into the inner member which is put into the outer member. The inner member is U-shaped and includes an inner portion and a pair of side portions extending in parallel with each other from both ends of the inner portion. Although the inner member can be U-shaped when it is molded, such requires a slide core and the installation space for the dies for the molding is not compact. For that reason, it is preferable for the inner member to be molded as a flat piece in which the inner portion is coupled to the side portions by bendable portions. If the inner member is molded in that way, the slide core is not needed and the dies for molding a plurality of such inner members together can be reduced in size. The bendable portions of the inner member thus molded are bent so that the inner portion and the side portions define a U.

It is preferable that a locking mechanism, which is actuated by being pushed and is released by being pushed again, is provided between the outer and the inner members, similar to typical locking mechanisms. It is preferable that a plate spring for urging the inner member in such a direction as to move it out from the outer member be provided between the outer and the inner members. If the locking mechanism and the plate spring are provided as mentioned above, the inner member is automatically moved out together with the accommodated object from the outer member when the locking mechanism released. It is preferable that an urging member for urging the accommodated object out of the inner member be provided on the inner portion of the inner member so as to be disposed between the inner portion and the accommodated object. If the urging member is provided in that way, the amount by which the accommodated object projects from the inner member can be increased to make it easier to remove the object from the holder, although the engagement of the engagement projections with the engagement openings restricts the extent of the movement of the inner member relative to the outer member.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENTS

Figure 1:
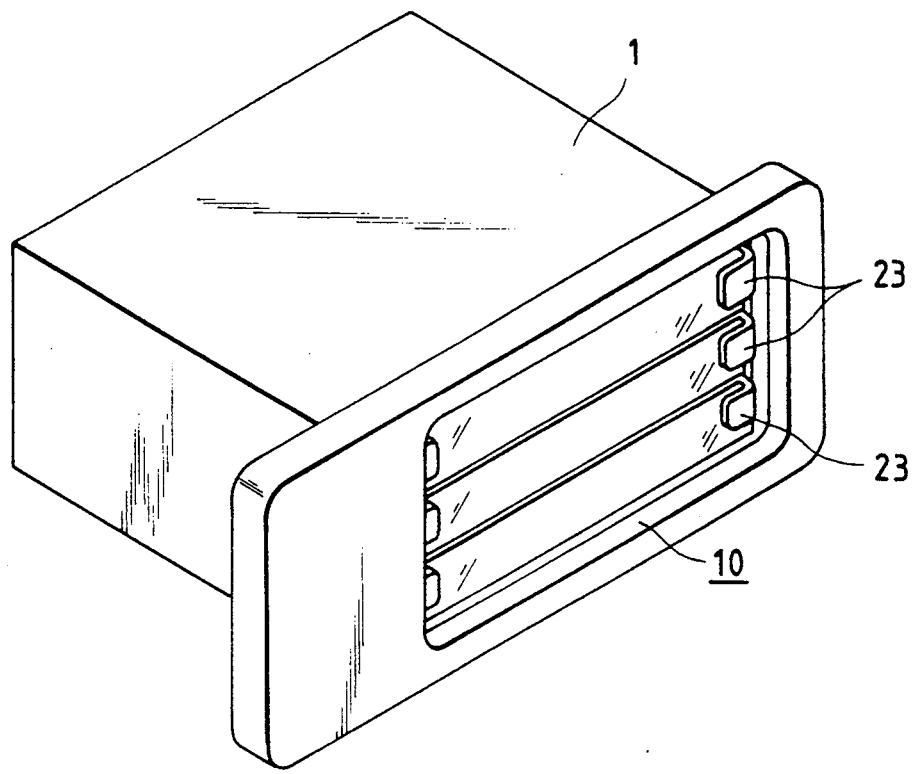
FIG. 1 is a perspective view of a holder in accordance with a first embodiment of the present invention.

FIGS. 1-5 show a holder in accordance with on of the embodiments of the invention. Individual cases which can be purchased and which contain compact disks are accommodated in the holder. The holder is installed in the instrument panel of a motor vehicle. The holder includes an outer member 1 shaped as a box, and three inner members 2 disposed in the outer member.

The outer member 1 has an opening 10 in the outer portion thereof and is closed at the inner portion thereof. Locking mechanisms 11, which are actuated by being pushed and released by being pushed again, and plate springs 12, which are urging members, are provided at the inner portion of the outer member 1. Such locking mechanisms are known, generally, and, without more, do not constitute a part of this invention. An exemplary locking mechanism which can be used in accordance with the invention is the locking mechanism shown in Examined Japanese Utility Model Publication No. 41026/1991 which corresponds to Unexamined Japanese Utility Model Publication No. 176373 published on Nov. 4, 1986. Three pairs of guide plates 13 are provided on the inside surface of the outer member 1 so as to extend in parallel to each other from the opening 10 toward the inner portion of the outer member, and the interior of the outer member is divided into three sections. A pair of engagement projections 14 are provided in each of the sections, and extend inwardly from the inside surface of the inner member 1.

Figure 2:
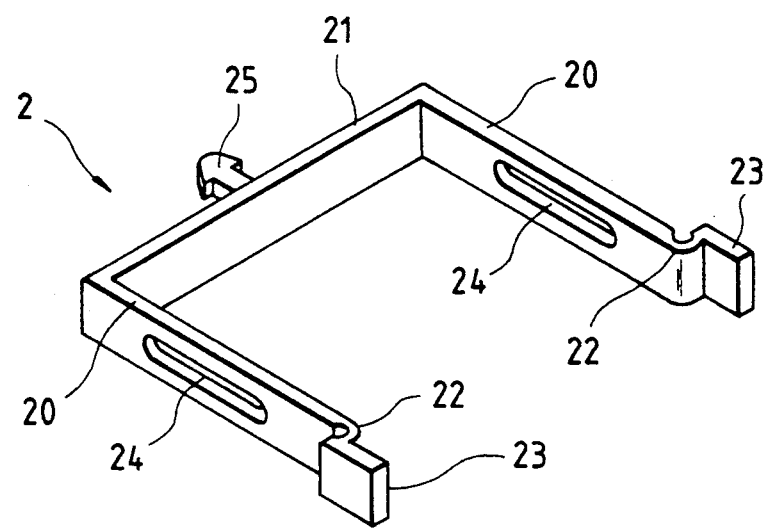
FIG. 2 is a perspective view of the inner member of the holder.

Each of the inner members 2 is U-shaped and includes a pair of side portions 20 which extend in parallel to each other, and an inner portion 21 coupling the side portions to each other, as shown in FIG. 2. The inner member 2 further includes hinge portions 22 and L-bent portions 23 at the outer ends of the side portions 20. The L-bent portions 23 can be swung about the hinge portions 22. Narrow holes 24 are provided in the central parts of the side portions 20. A hook 25 is formed on the inner portion 21 and projects therefrom opposite the side portions 20 so that the hook 25 can be engaged with the locking mechanism 11. The inner members 2 are disposed in the outer member 1 so that the outer ends of the side portions 20 are located near the opening 10 of the outer member, and the inner members can be moved relative to the outer member while being guided by the guide plates 13. The engagement projections 14 of the outer member 1 are engaged in the narrow holes 24 of the inner members 2 to restrict the extent of movement of the inner members relative to the outer member.

Figure 3:
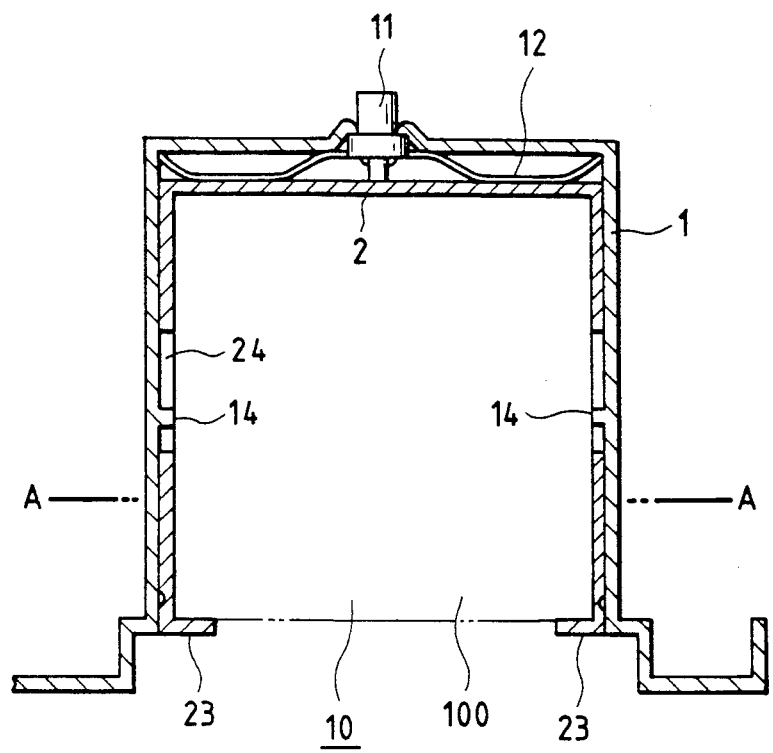
FIG. 3 is a sectional view of the holder with an object accommodated therein.
Figure 4:
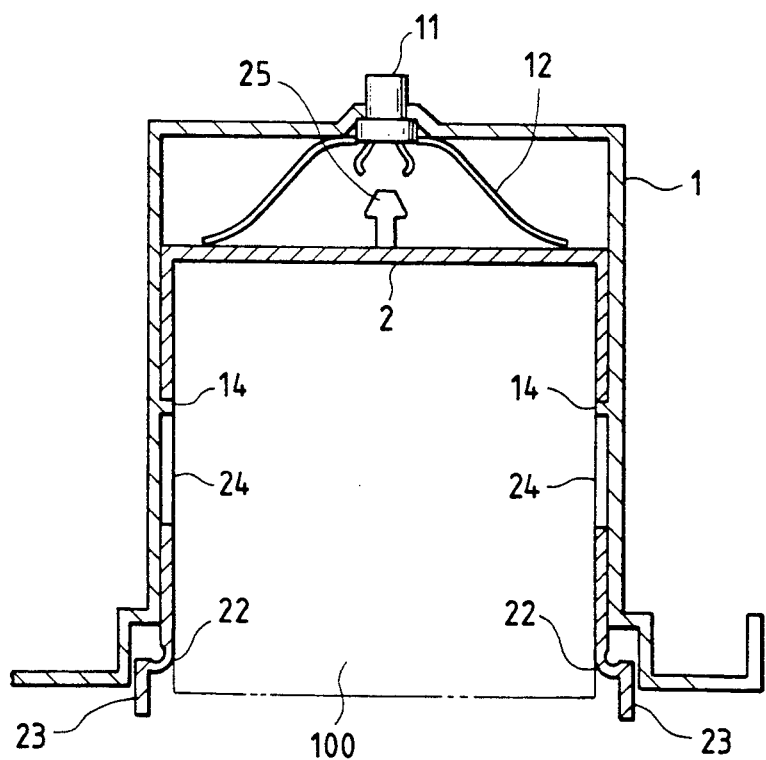
FIG. 4 is a sectional view of the holder with the object removed therefrom.
Figure 5:
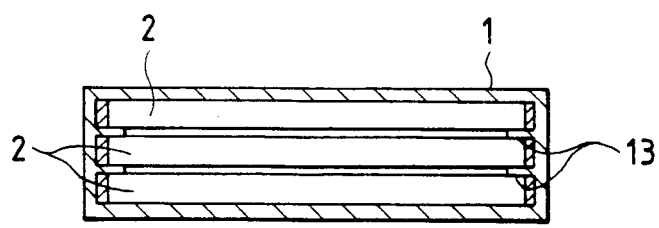
FIG. 5 is a sectional view of the holder along the line 5-5 in FIG. 3.

The case 100 for the compact disk is placed in the inner member 2, as shown in FIG. 4, and is then pushed so that the inner member 2 is pushed toward the inner portion of the outer member 1 against the urging force of the plate spring 12. The L-bent portions 23 are then disposed in opening 10 of the outer portion of the outer member 1, and the L-bent portions come into contact with the inside surface of the outer member and are pushed by it so that the L-bent portions are swung inward about the hinge portions 22. When the hook 25 is engaged with the locking mechanism 11 to fasten the inner member 2 to the outer member 1, the L-bent portions 23 engage the surface of the compact disk case 100 so that the case is firmly pinched and held by the L-bent portions and the inner portion 21 of the inner member 2, as shown in FIG. 3. The compact disk case 100 is thus accommodated in the holder so that the case is fastened to the inner member 2 which is in turn fastened to the outer member 1 by the locking mechanism 11. As a result, even if the motor vehicle equipped with the holder accommodating the compact disk case 100 moves or stops suddenly, the case does not fly out of the holder. Since the compact disk case 100 accommodated in the holder is pinched and held by the inner portion 21 and L-shaped portions 23 of the inner member 2, the case will not move and rattle. For that reason, no rattling noise will be heard.

When the compact disk case 100 is to be removed from the holder, the case is pushed so that the locking mechanism 11 and the hook 25 will be disengaged from each other and the inner member 2 is then pushed outwardly together with the case from the opening 10 in the outer member 1 by the urging force of the plate spring 12. The extent of the movement of the inner member 2 is restricted because the ends of the narrow holes 24 come into contact with the engagement projections 14. After the L-bent portions 23 of the inner member 2 are thus moved out from the opening 10, the portions can be swung about the hinge portions 22. For that reason, the L-bent portions 23 can be easily swung into the position shown in FIG. 4 by manually pulling the compact disk case 100 outwardly relative to the inner member 2. The case 100 can thus be removed from the holder.

Figure 6:
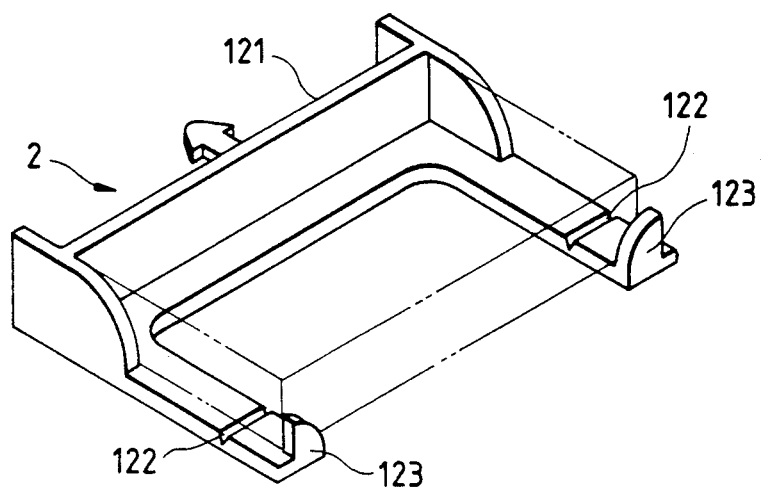
FIG. 6 is a perspective view of the inner member of a holder provided in accordance with a second embodiment of the present invention.
Figure 7:
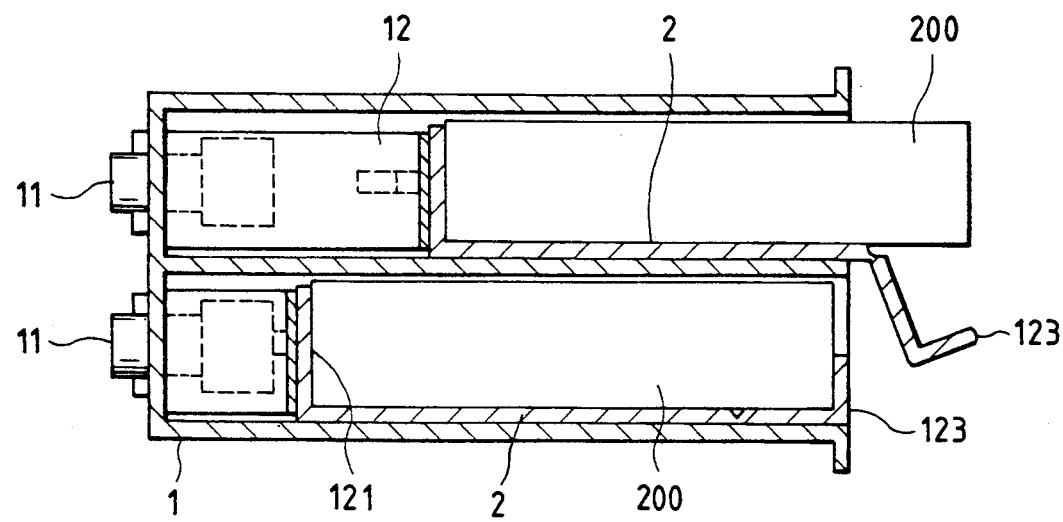
FIG. 7 is a sectional view of the holder of FIG. 6.
Figure 8:
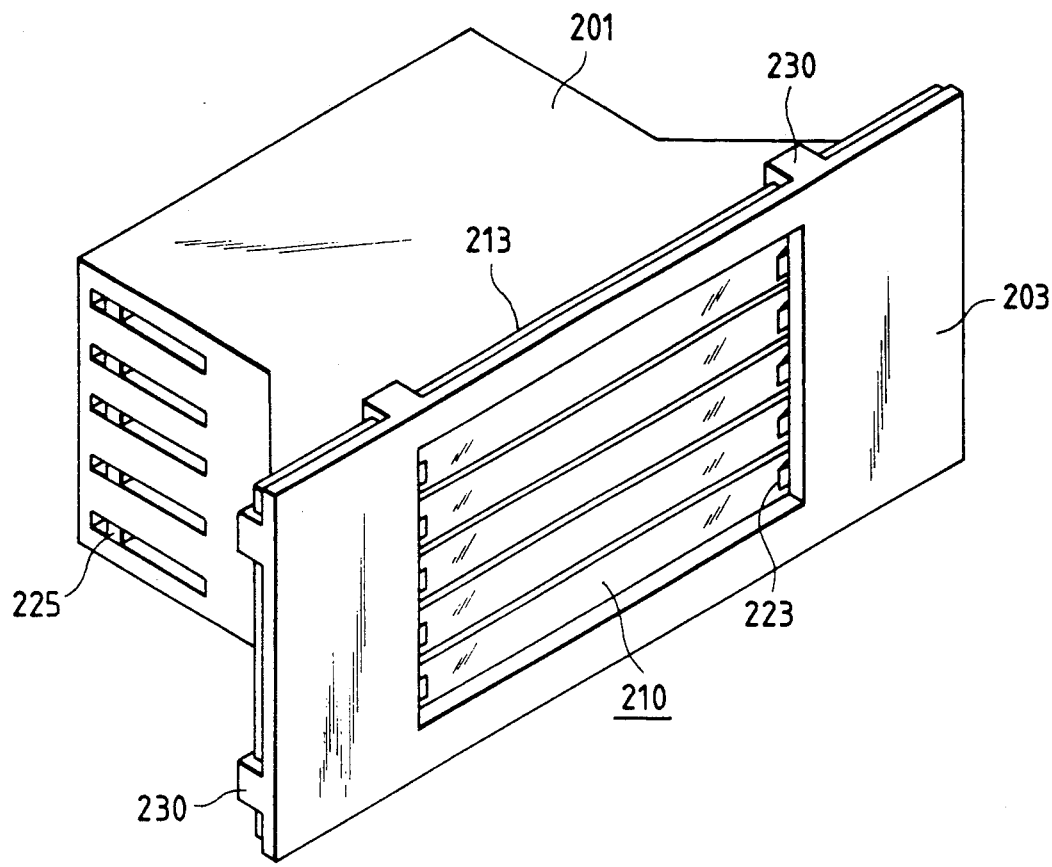
FIG. 8 is a perspective view of a holder provided in accordance with a third embodiment of the present invention.

FIGS. 6 and 7 show a holder in accordance with another embodiment of the invention. A case containing a tape cassette is accommodated in the holder. The holder is nearly the same in constitution and operation as the first embodiment except for the direction of swing of bent portions 123. The case includes an outer member 1, and two inner members 2 disposed therein and capable of being pulled out therefrom in a horizontal direction. The bent portions 123 of the inner members 2 can be swung up and down about the hinge portions 122 thereof.

When the cassette case 200 is to be accommodated in the holder, the case is put into the inner member 2 and then pushed against the urging force of an urging means so as to be inserted into the outer member 1. When the bent portions 123 of the inner member 2 are moved into the opening of the outer portion of the outer member 1, the bent portions are pushed by the inside surface of the outer member so as to swing inwardly and hold the case. At that time, the casing 200 is pinched and held by the bent portions 123 and the inner portion of the inner member 2, and a locking mechanism is actuated to fasten the inner member to the outer member 1.

When the cassette case 200 is to be removed from the holder, the case is pushed so that the locking mechanism is released. As a result, the inner member 2 will be urged outwardly from the outer member 1. Once the bent portions 123 of the inner member 2 are moved out from the opening in the outer portion of the outer member 1, the bent portions can be swung down, outwardly about the hinge portions 122 of the inner member to make it possible to take out the casing 200 from the inner member.

When the cassette case 200 is accommodated in the holder, the case is pinched and held by the bent portions 123 and inner portion 121 of the inner member 2 so as to be prevented from moving in the inner member and the inner member is fastened to the outer member 1 by the locking mechanism. For that reason, no rattling noise will be made due to friction or collision. Although the holder is disposed so that the case 200 is horizontally inserted and removed from the holder, the case accommodated therein will not fly out from the holder when the motor vehicle equipped with the holder starts or stops suddenly.

FIGS. 8-11 show a holder in accordance with yet another embodiment of the invention. The holder includes an outer member 201 shaped as a box, inner members 202 disposed therein, and an ornamental plate 203 which covers the peripheral portion of the opening 210 in the outer portion of the outer member.

Locking mechanisms 211, which are actuated by being pushed and released by being pushed again, and plate springs 212, which are urging members, are provided at the inner portion of the outer member 201. The outer member has a flange plate 213 around the opening 210, a pair of restriction surfaces 214 extending from the inner portion of the member so that the distance between the surfaces gradually increases toward the opening 210, and an accommodation space 215 defined on the surfaces. A plurality of pairs of guide plates 216 are provided on the restriction surfaces 214 and extend in parallel to the direction in which the inner member 202 is moved in and out relative to the outer member 201. The guide plates 216 divide the interior of the outer member 201 into a plurality of sections, for each of which a pair of right and left narrow holes 127 are provided in the outermember 201.

the outer member is molded in dies, one of which is for molding the inside surface of the outer member and needs to be set in the other of the dies in order to mold the outer member as a box. As a result, streaks due to the inner die are made at the time of the molding on the surface of the flange plate 213 of the outer member 201. Thus, the appearance of the outer member is deteriorated. Although such streaks are conventionally hidden with planted hair or the like, in accordance with the invention the flange plate 213 is covered with ornamental plate 203 to hide the streaks and hence improve the appearance of the holder. In addition, when the inner member 202 contacts the ornamental plate 203, the plate function as a means for swinging the swung portions 223 of the inner member.

Figure 9:
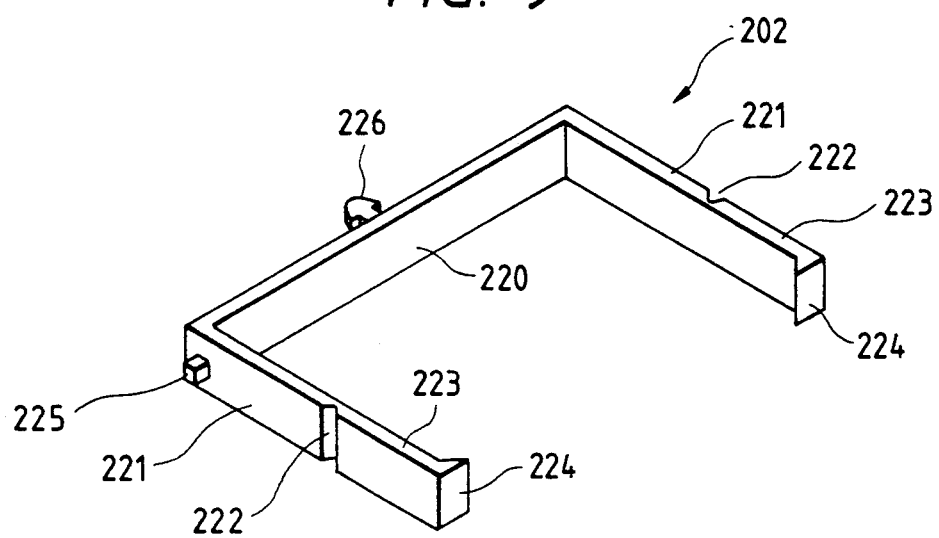
FIG. 9 is a perspective view of the inner member of the holder of FIG. 8.

The inner member 202 includes an inner portion 220, a pair of sliding portions 221 extending in parallel to each other from both ends of the inner portion, the swung portions 223 hinge portions 222 located between the outer ends of the sliding portions and the inner ends of the swung portions, and bent portions 224 provided at the outer ends of the swung portions and bent as L, as shown in FIG. 9. The swung portions 223 can be swung outward about the hinge portions 222. Engagement projections 225 are provided on the sliding portions 221 at the inner ends thereof near the inner portion 220, and extend outwardly. A hook 226, which is engaged with the locking mechanism 211, is provided on the inner portion 220, and extends therefrom opposite the sliding portions 221. The inner members 202 are disposed in parallel with each other at vertical intervals in the outer member 201 so that the bent portions 224 of the inner members correspond to the opening 210 of the outer portion of the outer member, and the inner members can be moved in and out relative to the outer member while being guided by the guide plates 216. The engagement projections 225 of the inner member 202 are engaged in the narrow holes 217 of the outer member 201 so that the extent of movement of the inner member relative to the outer member is restricted.

Figure 10:
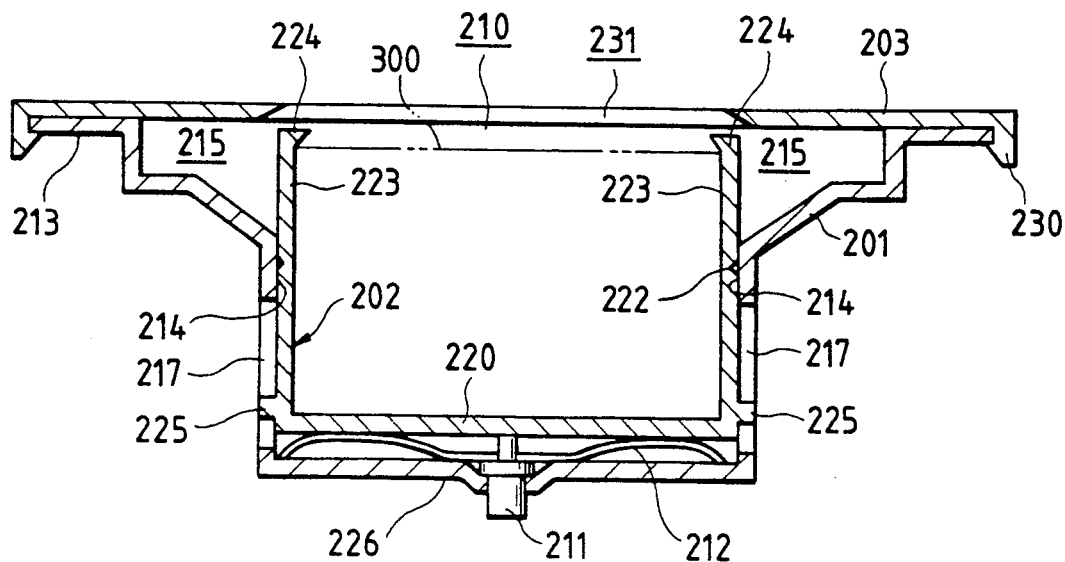
FIG. 10 is a sectional view of the holder of FIG. 8, with an object accommodated in the holder.
Figure 11:
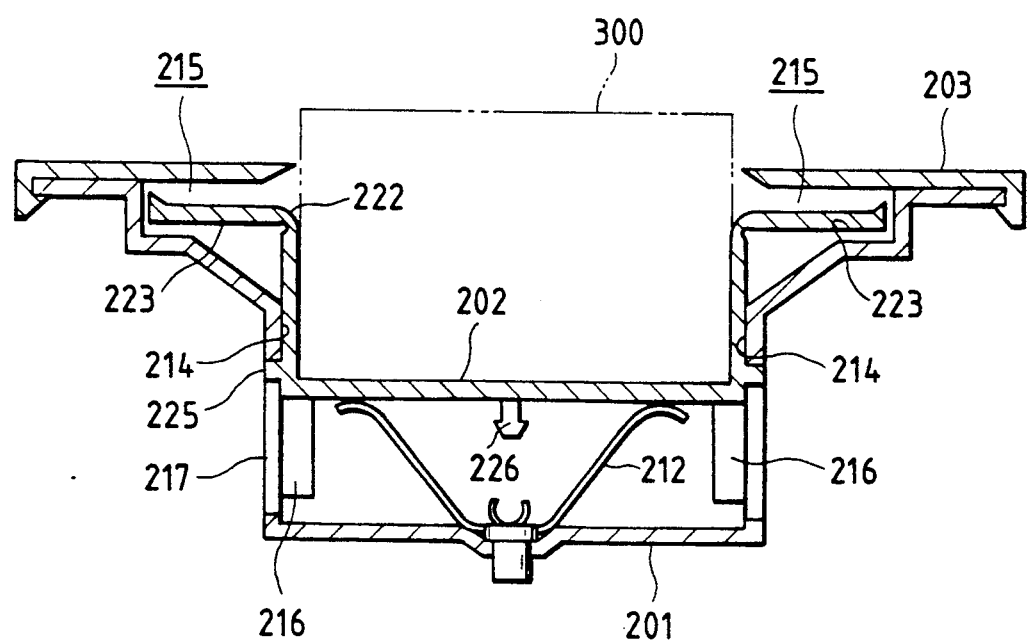
FIG. 11 is a section view of the holder of FIG. 8, with the object removed from the holder.
Figure 12:
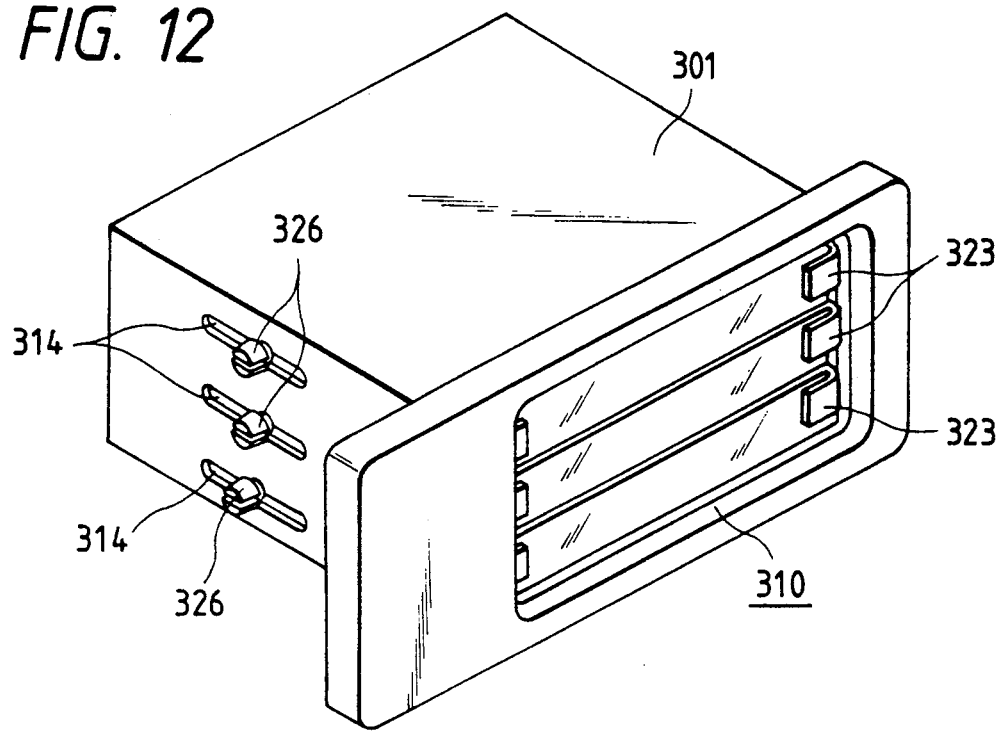
FIG. 12 is a perspective view of a holder provided in accordance with a fourth embodiment of the present invention.

The ornamental plate 203 is a frame-like member secured to the flange plate 213 of the outer member 201 and covering the outer surface of the flange plate, and has a plurality of holding portions 230 on the outer edges thereof. The holding portions 230 are engaged with the edges of the flange plate 213 and hold it so that the ornamental plate 203 is secured to the outer member 201. The ornamental plate 203 has an opening 231 whose length is larger than the inside length of the inner portion 220 of the inner member 202 but smaller than the outside length of the inner portion. The ornamental plate 203 covers the accommodation space 215 in the outer member 201. The facets of the ornamental plate 230 around the opening 231 thereof extend convergently outward, as shown in FIGS. 10 and 11, so that the bent portions 224 of the inner member 202 come into contact with the facets.

The operation of the accommodation case is as follows. When a cassette case 300 is to be accommodated in the holder, the case is placed in the inner member 202 of the holder, as shown in FIG. 11, and is then pushed inwardly so that the swung portions 223 of the inner member are swung inward about the hinge portions 222, and the hook 226 of the inner member is engaged with the locking mechanism 211 to fasten the inner member to the outer member 201, as shown in FIG. 10. As a result, the hinge portions 222 of the inner member 202 and parts of the swung portions 223 thereof are placed in contact with the restriction surface 214 of the outer member 201 so that the swung portions are prevented from being swung outwardly about the hinge portions. In addition, the swung portions 223 of the inner member 202 are aligned with the sliding portions 221 thereof and are kept in contact with the side surfaces of the cassette case 300, and the bent portions 224 of the inner member hold the case. For these reasons, even if the motor vehicle equipped with the holder is abruptly started or stopped, the cassette case 300 will not fly out from the holder. Since the case 300 is pinched and held by the inner portion 220 and bent portions 224 of the inner member 202, the case does not have any play. For that reason, no noise is made from friction or collision.

When the cassette case 300 is to be removed from the holder, the outer surface of the case, which is exposed in the opening 210 of the outer member 201, is pushed inwardly so that the hook 226 is disengaged from the locking mechanism 211. As a result, the inner member 202 is moved together with the cassette case 300 by the urging force of the plate spring 212 outwardly from the opening 210. When the bent portions 224 of the inner member 202 come into contact with the facets of the ornamental plate 203, the hinge portions 222 of the inner member go out of contact with the restriction surfaces 214 of the outer member 201 so that the swung portions 223 of the inner member are pushed by the facets of the ornamental plate and thereby swing outwardly into the accommodation space 215 inside the outer member 202, as shown in FIG. 11. At that time, the engagement projections 225 come into contact with the outer member 201 at the ends of the narrow holes 217 so that the extent of the movement of the inner member 202 relative to the outer member is restricted. As a result, although the cassette case 300 projects from the opening 210, the swung portions 223 and bent portions 224 of the inner member 202 are put into the accommodation space 215 covered with the ornamental plate 203. For that reason, the bent portions 224 do not project out from the opening 210, so that the appearance of the accommodation case is improved. In addition, the bent portions 224 are prevented from being damaged by being pushed by mistake with the cassette case 300 when the case is inserted into the holder.

Since the flange plate 213 of the outer member 201 is covered with the ornamental plate 203, the appearance of the holder is good. Since the cassette case 300 is held by the inner member 202 and the inner member is held by the outer member 201 when the case is accommodated in the holder, the case is prevented from flying out of the opening 210 due to the abrupt starting or stopping of the vehicle. Since the cassette case 300 is pinched and held by the inner portion 220 and bent portions 224 of the inner member 201, the case will not rattle in the holder. Since the bent portions 224 do not project out from the opening 210, the appearance of the case is improved and the inner member 202 is protected from damage.

When the inner member 202 is fully inserted in the outer member 201, the parts of the swung portions 223 are brought into contact with the restriction surfaces 214 of the outer member to keep the swung portions from being swung outward, the sliding portions 221, the hinge portions 222 and the swung portions extend together along straight lines nearly perpendicular to the inner portion 220, and the bent portions 224 hold the accommodated case 300. At that time, the case is pinched and held by the inner portion and bent portions of the inner member 202, and the inner member is fastened to the outer member 201 by the locking mechanism 211, so that the case is prevented from moving relative to the holder. Even though the case is disposed so that the cassette case 300 is horizontally inserted and removed from the holder, the case is kept from flying out from the holder when the vehicle moves or stops suddenly.

To remove the cassette case 300 from the accommodation case, the locking mechanism 211 is disengaged so that the urging force of the plate spring 212 moves the inner member 202 outwardly relative to opening 210 of the outer member 201. At that time, the hinge portions 222 and swung portions 223 of the inner member 202 move out of contact with the restriction surfaces 214 of the outer member 201 so that the swung portions are swung outward about the hinged portions. Either the hinge portions 222 may be present to urge the swung portions 223 outwardly, or means may be provided to push outwardly. When the swung portions 223 are swung outwardly, they enter the accommodation space 215 inside the outer member 201 and the bent portion 224 cease holding the cassette case 300, so that only the case projects out from the opening 210 of the outer member 201. At that time, the swung portions 223 do not project out from the outer member 201 but are put into the accommodation space 215 inside the outer member so that the appearance of the case is good. In addition, as noted above, the swung portions 223 are prevented from being damaged by being pushed by the cassette case when the case is inserted into the holder.

FIGS. 12–20 show a holder in accordance with yet another embodiment of the invention. The holder is for accommodating individual cases each containing a compact disk, and is installed in the instrument panel of a motor vehicle. The holder includes an outer member 301 shaped as a box, and inner members 302 disposed therein.

Figure 13:
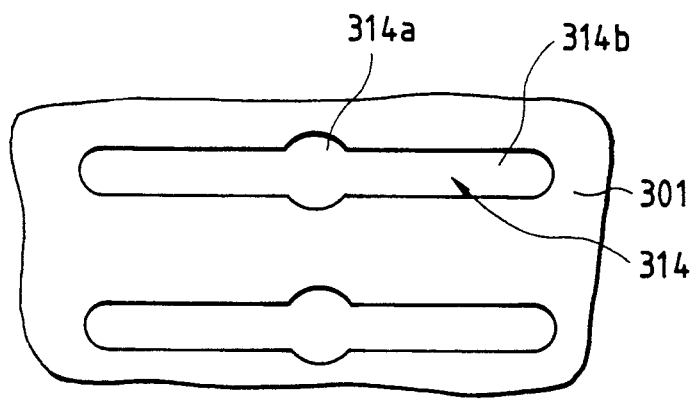
FIG. 13 is a side view of a major part of the outer member of the holder of FIG. 12.
Figure 14:
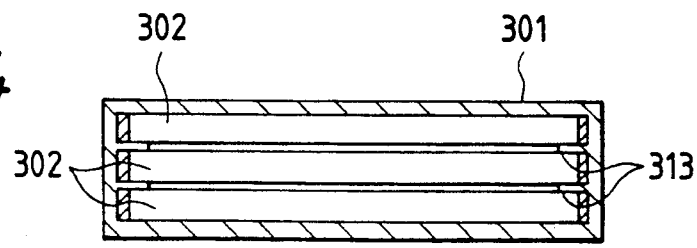
FIG. 14 is a sectional view of the holder of FIG. 12.
Figure 19:
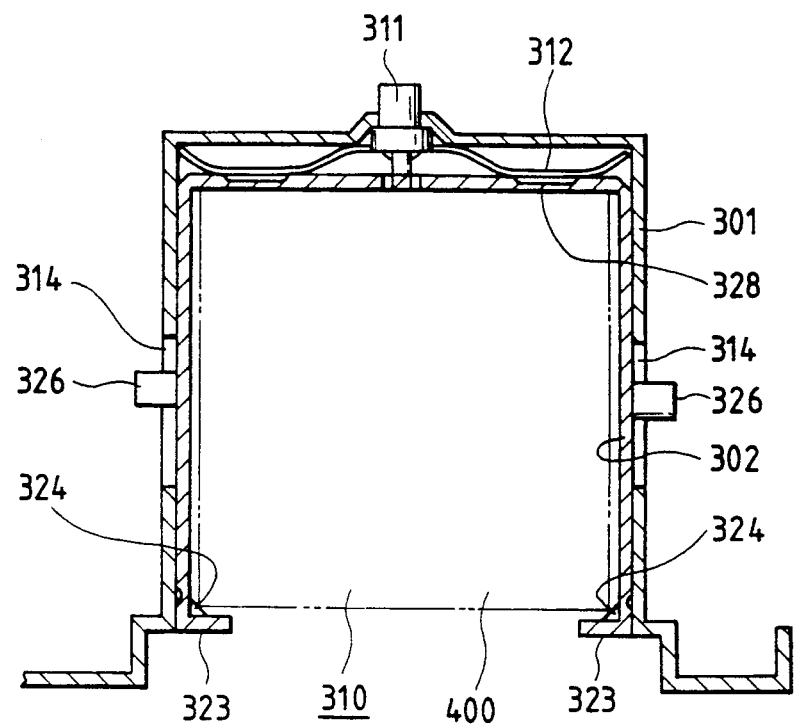
FIG. 19 is a sectional view of the case of FIG. 12, in a state of use of the holder.
Figure 20:
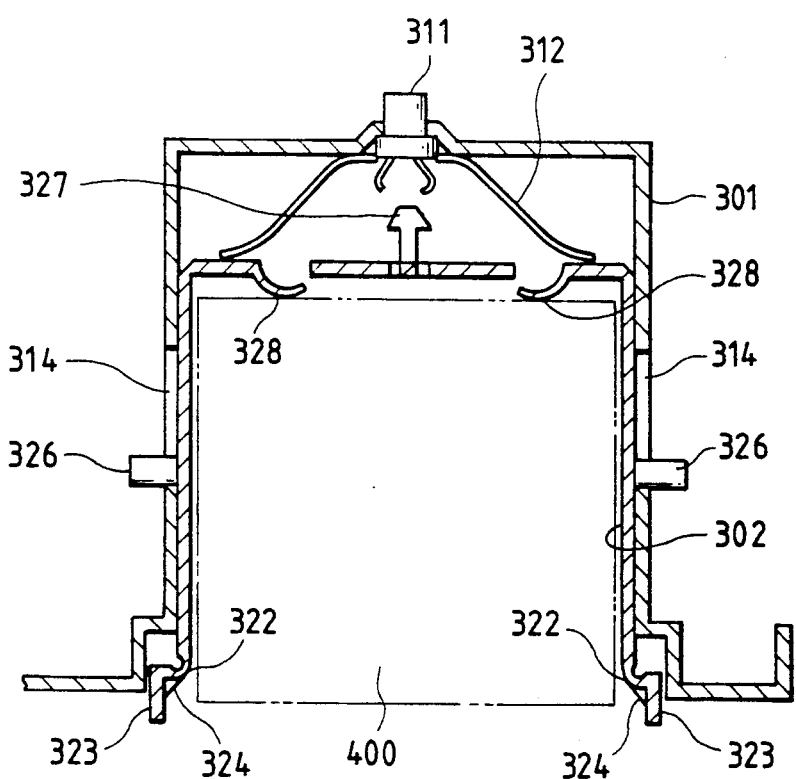
FIG. 20 is a sectional view of the case of FIG. 12, in another state of use of the holder.

The outer member 301 is shaped as a box which is closed except on one side thereof, and has an opening 310 in its outer portion. Locking mechanisms 311, which are actuated by being pushed and released by being pushed again, are provided in the inner portion of the outer member 301, and plate springs 312 are provided on the inside of the inner portion, as shown in FIGS. 19 and 20. Three pairs of guide plates 313 are provided on the inside surface of the outer member 301 and extend in parallel to each other from the opening 310 of the outer member toward the inner portion thereof so that the interior of the member is divided into three sections, as shown in FIG. 14. Both side portions of the outer member 301 have engagement openings 314 consisting of large holes 314a and narrow holes 314b extending in mutually opposite directions from the large holes, as shown in FIG. 13.

Figure 15:
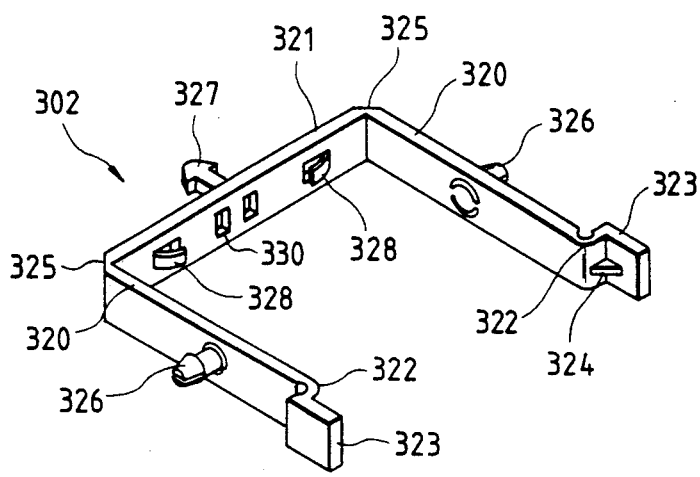
FIG. 15 is a perspective view of the inner member of the holder of FIG. 12.
Figure 18:
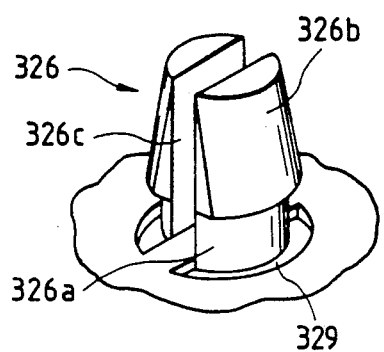
FIG. 18 is a perspective view of the engagement projection of the holder of FIG. 12.

Each of the inner members 302 is U-shaped and includes a pair of side portions 320 extending in parallel to each other, an inner portion 321 coupling the side portions to each other, hinge portions 322 provided at the outer ends of the side portions, L-bent portions 323 extending from the hinge portions and capable of being swung about the hinge portions, ribs 324 provided at the nooks of the L-bent portions and coupling the parts thereof to each other, and bendable portions 325 provided between the inner portion and the side portions, which can be moved relative to each other by bending the bendable portions, as shown in FIG. 15 Engagement projections 326 are provided on the side portions 320 at the mid section thereof, and extend outwardly therefrom. Each of the projections 326 includes a bar portion 326a, a head portion 326b provided on the tip of the bar portion, and a slit 326c in the center of the projection so that the projection is split into halves, as shown in FIG. 18. Because of the presence of the slit 326a, the projection 326 can be elastically deformed to decrease the diameter thereof. The largest diameter of the head portion 326b of the projection 326 is larger than the diameter of the large hole 314a of the engagement opening 314 of the outer member 301. The diameter of the bar portion 326a of the projection 326 is slightly smaller than the width of the narrow hole 314b of the opening 314. A hook 327, which is engaged with the locking mechanism 311, is provided on the inner portion 321 at the mid section thereof, and extends therefrom opposite the side portions 320. A pair of spring portions 328 are provided on the inner portion 321 near the ends thereof, and project from the same side thereof as the side portions 320.

Figure 16:
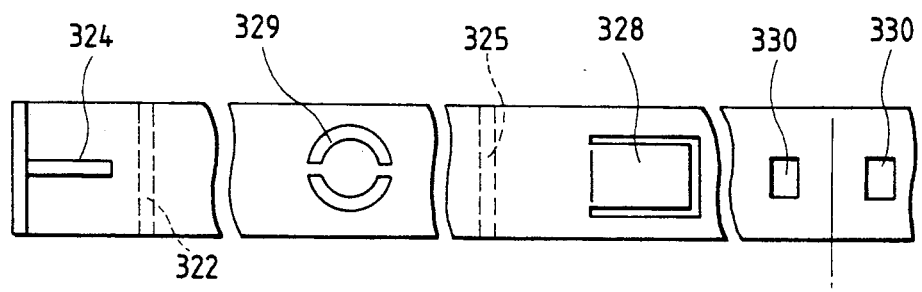
FIG. 16 is a developed view of a half of the inner member of FIG. 15.
Figure 17:
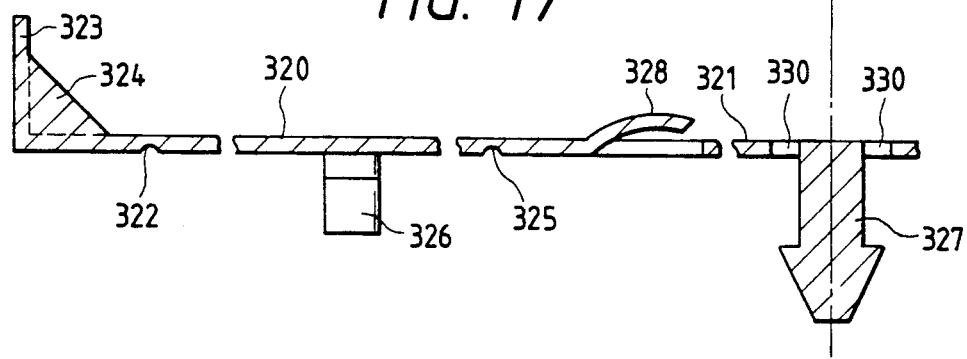
FIG. 17 is a sectional view of the half of FIG. 16.

When the inner member 302 is molded, it is a flat piece as shown in FIGS. 16 and 17. The inner member 302 is thereafter bent at the bendable portions 325 so that the member is U-shaped. Since the inner member 302 is molded as the flat piece, the dimensions of the dies for the molding can be decreased. Since holes 330 are provided in the inner member 302 at both sides of each of the engagement projections 326 or the hook 327, a slide core does not need to be used for molding. After the inner member 302 is bent at the bendable portions 325, the member is put into the outer member 301. The engagement projections 326 are then press-fitted into the large holes 314a of the engagement openings 314 of the outer member 301. At that time, the head portions 326b of the engagement projections 326 are pressed and elastically deformed by the facets of the outer member 301 disposed around the large holes 314a so that the width of the slits 326c of the projections is decreased. After the head portions 326b are inserted through the large holes 314a, the head portions recover their original form and size due to their elasticity. For that reason, the projections 326 are engaged in the openings 314 so that the head portions are prevented from going back through the openings. As a result, the side portions 320 of the inner member 302 are prevented from being deformed toward each other. The side portions 320 are thus kept at a prescribed distance from each other.

When the compact disk case 400 is to be accommodated in the holder, the case is put into the inner member 302 as shown in FIGS. 19 and 20. At that time, since the side portions 320 of the inner member 302 are kept at the prescribed distance from each other, it is easy to put the case 400 into the inner member. The case 400 is then pressed so that the inner member 302 is pushed toward the inner portion of the outer member 301 against the urging force of the plate spring 312. When the bent portion 323 of the inner member 302 enter into the opening 310 of the outer member 301, the bent portions come into contact with the inside surface of the outer member and are pushed thereby so that the bent portions are swung inward about the hinge portions 322. When the hook 327 of the inner member 302 is thereafter engaged with the locking mechanism 311 to fasten the inner member to the outer member 301, the bent portions 323 hold the case 400 so that the case is pinched and held by the inner portion 321 and bent portions 323 of the inner member, as shown in FIG. 19. Since the case 400 thus pinched and held is kept in elastic contact with the spring portions 328 provided on the inner portion 321 and is also kept in contact with the oblique facets of the ribs 324, the case does not have any play. When the case 400 is thus accommodated in the holder, as shown in FIG. 19, the case is fastened to the inner member 302 and the inner member is in turn fastened to the outer member 301 by the locking mechanism 311 so that the case will not fly out from the holder even if the motor vehicle equipped with the holder is abruptly moved or stopped.

When the compact disk case 400 is to be removed from the holder, the case is pressed so that the hook 327 is disengaged from the locking mechanism 311, and the inner member 302 is urged out together with the case from the opening 310 of the outer member 301 by the plate spring 312, as shown in FIG. 20. The extent of movement of the inner member 302 relative to the outer member 301 is restricted because the bar portions 326a of the engagement projections 326 come into contact with the outer member 301 at the ends of the narrow holes 314b of the engagement openings 314. When the bent portions 323 are moved out from the opening 310 of the outer member 301, the case 400 pushes the ribs 324 due to the resilient forces of the spring portions 328 so that the bent portions 323 are swung outward about the hinged portions 322 through the action of the oblique facets of the ribs. As a result, the case 400 can be manually removed from the inner member 302.

Figure 21:
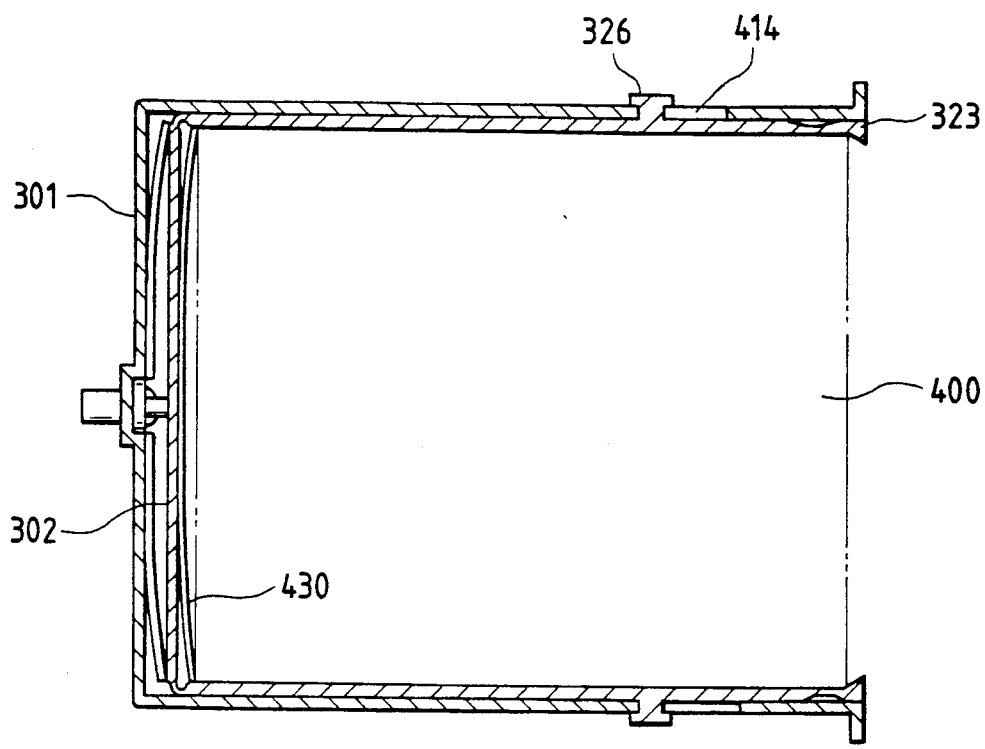
FIG. 21 is a sectional view of a holder provided in accordance with a fifth embodiment of the present invention, with an object accommodated in the holder.
Figure 22:
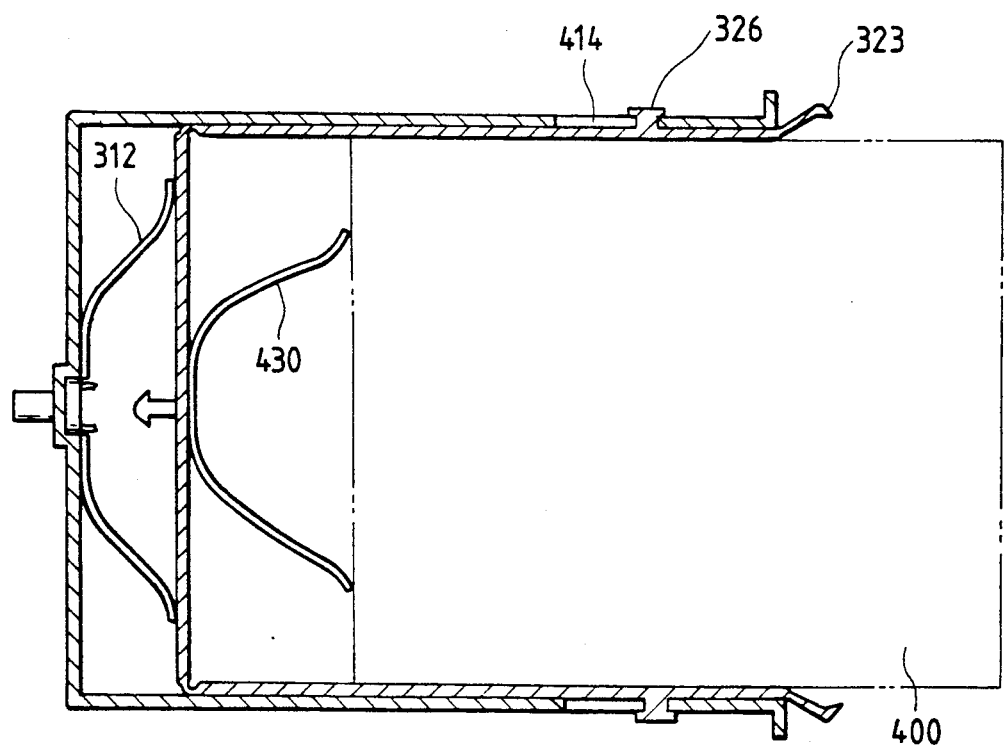
FIG. 22 is a sectional view of the holder of FIG. 21, with the object removed from the holder.
Figure 23:
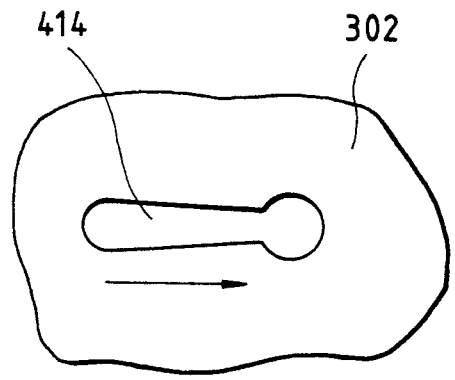
FIG. 23 is a side view of the engagement opening of the holder of FIG. 21.
Figure 24:
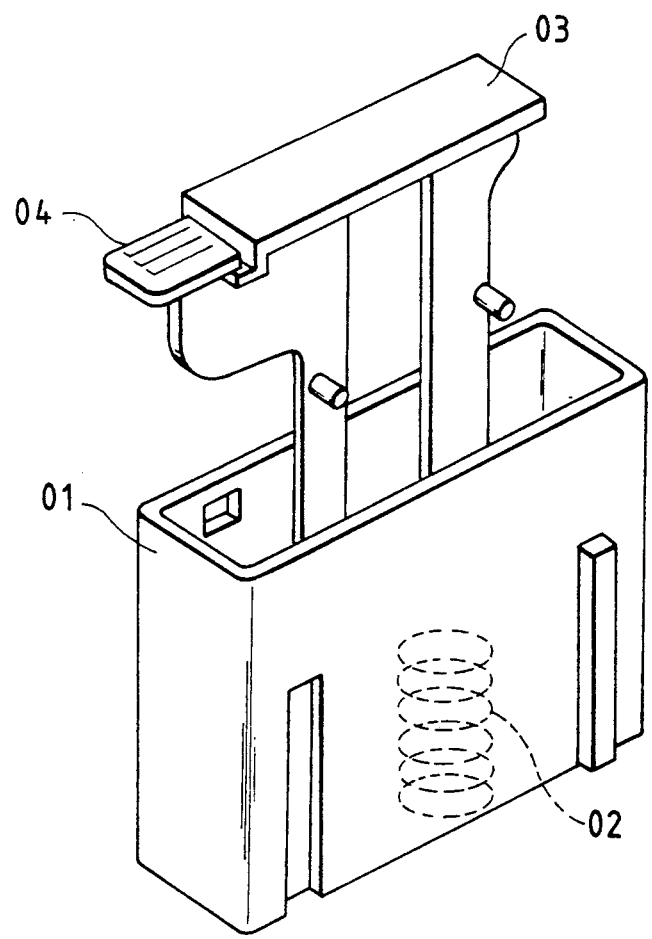
FIG. 24 is a perspective view of a conventional accommodation case.

FIGS. 21–23 show a holder in accordance with a further embodiment of the invention. The holder is the same as the fourth embodiment except that second plate springs are provided instead of the spring portions 328, and the engagement openings of the holder differ in form from openings 314. The holder is denoted by the same reference symbols as the fourth embodiment except for the second plate springs and the engagement openings.

In the holder, the second plate spring 430 is provided so as to be located between an inner member 302 and a compact disk case 400 accommodated in the holder and urge the case outwardly relative to the inner member. When the case 400 is accommodated in the holder as shown in FIG. 21, the case is pinched and held by the second plate spring 430 and the bent portions 323 of the inner member 302 so that the case does not have any play in the holder.

When the case 400 is to be removed from the holder, the case is moved together with the inner member 302 by the urging force of a plate spring 312 while remaining pinched and held by the bent portions 323 of the inner member and the second plate spring 430, until the bent portions are moved out from the opening of the outer member 301. When the bent portions 323 are then moved out from the opening of the outer member 301, the force of the second plate spring 430, which is pushing the case 400, acts to swing the bent portions outwardly thereby disengaging them from the case. As a result, the case 400 is moved out from the inner member 302 by the urging force of the second plate spring 430 so that the extent of the projection of the case from the outer member 301 is greater than that of the fourth embodiment. For that reason, it is easier to remove the case from the holder.

The extent of the movement of the inner member 302 relative to the outer member 301 is restricted because the engagement projections 326 of the inner member come into contact with the ends of the engagement openings 414. Each of the openings 414 is shaped as a key hole, as shown in FIG. 23, so that the width of the opening gradually decreases from the inner portion of the inner member 302 toward the outer ends of the side portions thereof (shown by an arrow in FIG. 23). For that reason, when the inner member 302 is moved by the urging force of the plate spring 312, a force acts on each engagement projection of the inner member 302 to decrease the width of the central slit 326c of the projection so that the resistance to the movement increases as the length of movement increases. In other words, the resistance rises as the inner member 302 is moved outwardly from the outer member 301. For that reason, the bent portions 323 of the inner member 302 are slowly opened outwardly so that the movement of the inner member is pleasing.

Although the amount that the inner member 302 projects from the outer member 301 is relatively small, the compact disk case 400 can be protruded from the inner member by the urging force of the second plate spring 430. For that reason, the amount by which the bent portions 323 extend from the outer member 301 can be decreased to make the appearance of the holder good when the case 400 is removed therefrom.

When the inner member 302 is to be placed in the outer member 301, the had portions of the engagement projections 326 of the inner member are first inserted through the engagement opening 414 of the outer member so that the bar portions of the projections are located in the openings and can be moved therein. As a result, the inner member 302 can be moved in and out relative to the outer member 301. Since the head portions of the engagement projections 326 are kept in contact with the outside of the outer member 301 around the engagement openings 414, the side portions are prevented from being deformed toward each other. Since the bar portions of the engagement projections 326 comes into contact with the outer member 301 at the ends of the engagement openings 414 when the inner member 302 is moved relative to the outer member, the extent of movement of the inner member relative to the outer member is restricted to prevent the inner member from coming out of the outer member.

Even if the inner member 301 is deformed before being put into the outer member 302, the inner member can resume its prescribed form by engaging the projections 326 in the openings, as is apparent from the above description. The side portions of the inner member 302 can thus be kept at a prescribed distance from each other to make it easy to accommodate the compact disk case 400 in the holder. Since a finger can be put in the inner member 302 and push each side portion thereof on the inside of the portion to engage projections 326 in the openings 414 to fit the inner member in the outer member 301, the assembly of the holder is easy.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. A holder for receiving a case, said holder including:
    an outer member, said outer member being box-shaped and having an opening defined in a front wall thereof,
    an inner member, said inner member being supported in said outer member so that said inner member can be moved in and out through said opening, said inner member being U-shaped having a base portion and a pair of legs extending perpendicularly from said base portion, substantially in parallel to each other, said base portion being defined in a plane which is substantially parallel to a plane of said front wall, said legs each terminating distally in a free end remote from said base portion and having hinge portions and L-bent portions at said free ends thereof adjacent said opening so that said L-bent .portions extend from said hinge portions and can be swung thereabout when said inner member is moved relative to said outer member, said L-bent portions being pushed by an inside surface of said outer member so that said L-bent portions are swung inward when said inner member is moved inwardly relative to said outer member, and when said inner member is moved outwardly relative to saidouter member, said L-bent portions are swung outwardly,
    an urging member, said urging member being provided between said outer and inner members and urging said inner member outwardly relative to said opening, and
    a locking mechanism, said locking mechanism selectively locking said inner member with respect to said outer member.

2. A holder according to claim 1, in which said outer member has a pair of engagement projections extending inwardly form the inside surface thereof, and said inner member has a pair of narrow holes provided in central parts of said legs and respectively engaged with said projections of said outer member so as to restrict the extent of movement of the inner member relative to said outer member.

3. A holder according to claim 1, in which said L-bent portions of said inner member can be swung up and down about the hinge portions thereof.

4. A holder according to claim 1, in which said inner member has a pair of engagement projections extending outwardly from an outside surface thereof, and said outer member has a pair of narrow holes provided on side portions and respectively engaged with said projections of said inner member so as to restrict the extent of movement of the inner member relative to said outer member.

5. A holder according to claim 4, in which said narrow holes include large hole portions and narrow hole portions extending in mutually opposite direction from said large hole portions.

6. A holder according to claim 5, in which each of said projections includes a bar portion, a head portion provided on a tip of said bar portion, and a slit so that said projection is split into halves.

7. A holder according to claim 6, in which the largest diameter of said head portion of said projection is larger than the diameter of said large hole portions of said narrow holes and the diameter of said bar portion of said projections is slightly smaller than the width of the narrow hole portion of said narrow holes.

8. A holder according to claim 1 further comprising an ornamental plate which covers a peripheral portion of openings on an outer portion of said outer member and an accommodation space defined by said outer member and said ornamental plate, in which said L-bent portions are swung outward and accommodated in said accommodation space.

9. A holder according to claim 1, in which ribs are provided at nooks of the L-bent portions.

10. A holder according to claim 9, in which said inner member further comprises a spring member.

11. A holder according to claim 1 further comprising a plate spring mounted to said inner member.

* * * * *